United States Patent
Ehlinger et al.

(10) Patent No.: US 6,907,031 B1
(45) Date of Patent: Jun. 14, 2005

(54) CUSTOMER PREMISES EQUIPMENT CALL RE-ROUTING TECHNIQUE

(75) Inventors: James Ehlinger, Colts Neck, NJ (US); Paul J. Fellingham, Holmdel, NJ (US); Christopher P Gilboy, Freehold, NJ (US)

(73) Assignee: AT&T Corp., New York, NY (US)

( * ) Notice: Subject to any disclaimer, the term of this patent is extended or adjusted under 35 U.S.C. 154(b) by 292 days.

(21) Appl. No.: 09/793,641

(22) Filed: Feb. 26, 2001

(51) Int. Cl.⁷ .............................................. H04L 12/66
(52) U.S. Cl. ....................... 370/352; 370/401; 370/254
(58) Field of Search ................................ 370/352, 353, 370/354, 401, 395.52, 395.72; 379/221.01, 221.02, 221.09

(56) References Cited

U.S. PATENT DOCUMENTS

| | | | | |
|---|---|---|---|---|
| 5,999,525 A | * | 12/1999 | Krishnaswamy et al. | ... 370/352 |
| 6,064,653 A | * | 5/2000 | Farris | .......................... 370/237 |
| 6,064,727 A | | 5/2000 | Levy | |
| 6,185,204 B1 | * | 2/2001 | Voit | ............................ 370/352 |
| 6,253,249 B1 | * | 6/2001 | Belzile | ........................ 709/249 |
| 6,282,192 B1 | * | 8/2001 | Murphy et al. | ............. 370/352 |
| 6,304,565 B1 | * | 10/2001 | Ramamurthy | ................ 370/352 |
| 6,330,316 B1 | * | 12/2001 | Donak et al. | ................ 379/196 |
| 6,337,858 B1 | * | 1/2002 | Petty et al. | .................. 370/356 |
| 6,363,065 B1 | * | 3/2002 | Thornton et al. | ........... 370/352 |
| 6,389,005 B1 | * | 5/2002 | Cruickshank | ............... 370/352 |
| 6,510,219 B1 | * | 1/2003 | Wellard et al. | ......... 379/221.01 |

FOREIGN PATENT DOCUMENTS

| | | | | |
|---|---|---|---|---|
| WO | WO 99/05590 | * | 2/1999 | ............. G06F/3/00 |

* cited by examiner

*Primary Examiner*—Man U. Phan
*Assistant Examiner*—Toan Nguyen

(57) ABSTRACT

A call from a calling party (12) is routed to at least one called party (14, 16, and 18) in accordance with the network preference of the calling party while taking into account the network capability of the called party. The calling party initiates an attempt to the called party over a preferred network (32) by first querying a database (40) containing records, each indicating the network capability of a corresponding called party. If the called party has the capability of receiving a call on the preferred network, the call is routed over that network. Otherwise, the call is routed over an alternate network (30) on which the called party has the capability of receiving a call.

22 Claims, 2 Drawing Sheets

NETWORK DIAGRAM
10

NETWORK DIAGRAM
10

FLOW LOGIC

CUSTOMER PREMISES EQUIPMENT CALL RE-ROUTING TECHNIQUE

TECHNICAL FIELD

This invention relates to a technique for determining how to best route a call to a subscriber.

BACKGROUND ART

Many providers of traditional circuit-switched telephony service, such as AT&T, now offer at least some subscribers the capability to complete voice calls over the Internet. Indeed, the total number of minutes of Voice Over Internet Prtocol (VOIP) calls continues to grow each year because subscribers find such calls more economical by virtue of the fact that such calls often cost less than traditional circuit-switched calls. Unfortunately, the present lack of compatible common gateways has limited deployment of VOIP service. In addition, VOIP telephony does not yet enjoy the reliability of conventional circuit-switched telephony.

In an effort to address the issue of the reliability, U.S. Pat. No. 6,064,727 issued May 16, 2000, to AT&T, the present assignee, proposes a technique for offering a telephone subscriber uninterrupted service by routing a call over an alternate communications channel (e.g., a PSTN link) if call routing cannot occur over a primary communications channel, for example a cable television link. The technique for maintaining uninterrupted telecommunications service disclosed in the '727 patent concerns the availability of the primary communications channel, as well as the characteristics of the call. However, the '727 patent does not address the communications capability of the called party, and in particular, whether the called party has the ability to receive calls over a particular network.

Thus, there is a need for a technique that affords improved reliability while addressing the communications capability of the called party.

BRIEF SUMMARY OF THE INVENTION

Briefly, in accordance with a preferred embodiment, the present invention provides a technique for routing a call over at least one of a plurality of diverse networks from a calling party to a called party in accordance with the network preference of the calling party while accounting for the network capability of the called party. In response to a call attempt launched by the calling party over a preferred network, a query is made to a database to ascertain the network capability of the called party. Within the database are records, each indicating the network capability of a corresponding called party, that is the ability of each called party to receive calls over one or more diverse networks. In response to the query, the database returns the network capability of the called party. A determination is then made whether a call can be routed over the preferred network in accordance with the network capability of the called party. If the called party has the capability to receive the call over the preferred network, the call is routed over that network. Otherwise, the call is routed over another network on which the called party has the capability of receiving a call. For example, the calling party may prefer to route calls over an IP network. If the called party has the capability of receiving a call over the IP network, then the call is routed to the called party over that network. If the called party lacks such a capability, then the call is routed over another network, such as the PSTN network, assuming that the called party has the capability of receiving calls over that network.

The network capability of the called party stored in the database is updated on a regular basis to reflect changes in the connectivity of the called party. Further, the network capability information also includes information regarding the cost associated with such calls. Thus, the determination of whether to route calls over the preferred network takes into account not only the called party's physical capability to receive a call on a network, but the relative economic cost of doing so relative to other networks.

DETAILED DESCRIPTION

Figure 1:
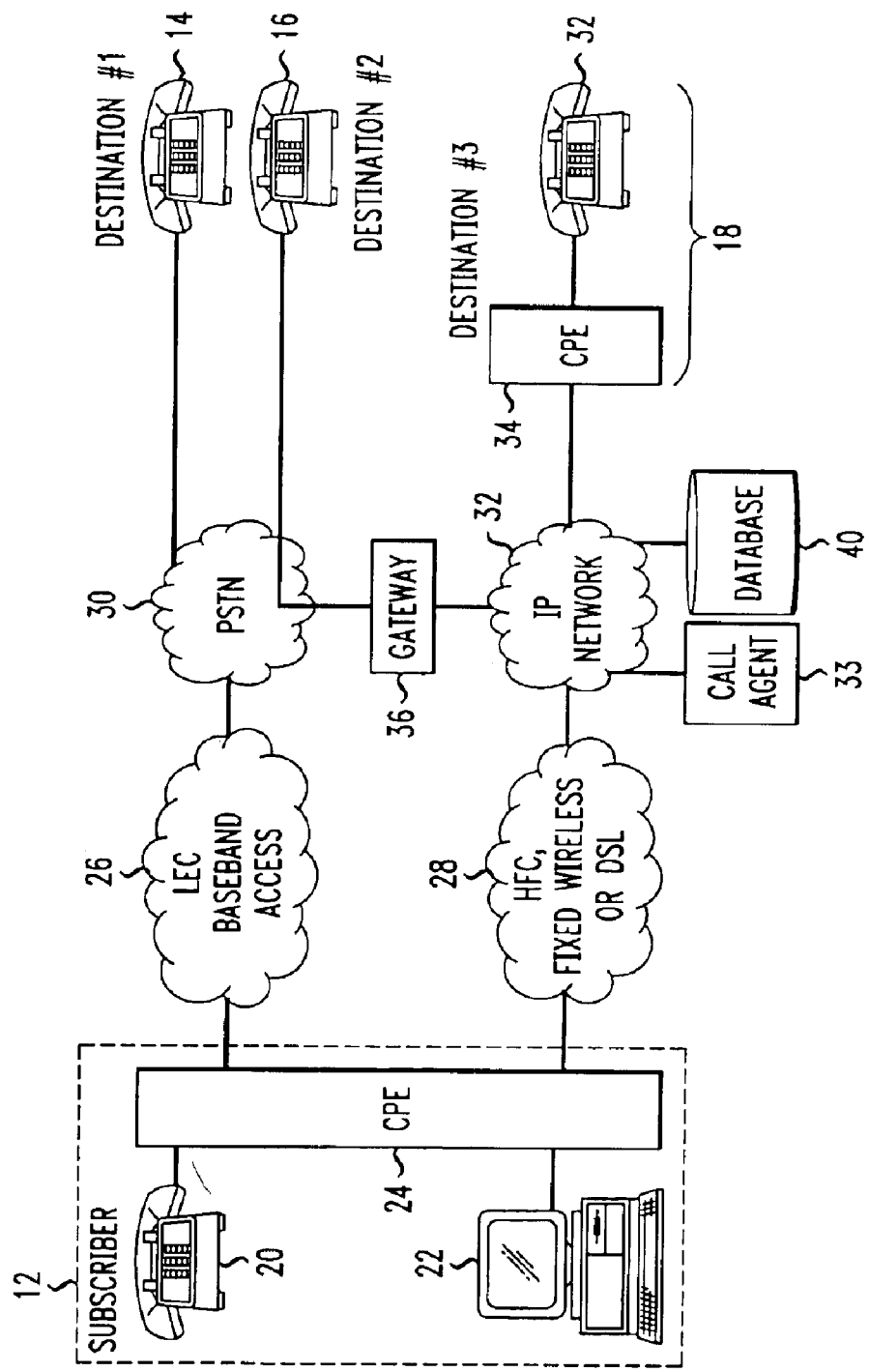
FIG. 1 illustrates a block schematic diagram of a communications network for practicing call routing technique of the invention.

FIG. 1 illustrates a block schematic diagram of a composite network 10 for routing a call from a calling party 12 to one of a plurality of called parties 14, 16, and 18, respectively, in accordance with a network preference of the calling party while accounting for the network capability of the called party in accordance with the invention. In the embodiment of FIG. 1, the calling party 12 possesses one or more communications devices at its premises, illustratively represented by voice station set 20 and a personal computer 22, both linked to a first Customer Premises Equipment (CPE) device 24 typically taking the form of a Broadband Telephony Interface (BTI) or Multimedia Terminal Adapter (MTA) as are known in the art.

The CPE device 24 functions to interface both the telephone set 20 and the personal computer 22 to both a Local Exchange Carrier (LEC) baseband access network 26 and to a local access data network 28. In practice, the local access data network 28 may take the form of a Hybrid Fiber Coax network, a Digital Subscriber Line (DSL) network, a fixed wireless network, or an Internet Service Provider network. By linking both the telephone set 20 and the computer 22 to the LEC access network 26, the CPE device 24 enables the calling party 12 to launch a conventional or Plain Old Telephone Service (POTS) call through the LEC baseband network to a Public Switched Telephone Network (PSTN) 30, such as the PSTN maintained by AT&T. Upon receipt of a POTS call from the LEC baseband network 26, the PSTN 30 routes the call to one or more of the called parties, such as called parties 14 and 16 who each enjoy a link to the PSTN via the same or separate LEC networks (not shown) that each provide the called parties with POTS service.

The CPE device 24 serves to convert a voice call originated on either the telephone set 20 or the computer 22 into VOIP calls for transmission through the local data network 28 into an IP network 32. Conversely, the CPE device 24 will convert a VOIP call received from IP network 32 through the local access data network 28 into a voice call for receipt on either the telephone set 20 or computer 22. The IP Network 32 carries a VOIP call originated by the calling party 12 to an IP-enabled called party, such as called party 18 that also enjoys a link to the IP network 32 through a local access data network (not shown) similar to the data network 28. In the illustrated embodiment, the called party 18 has a communications device 32, typically a telephone set (or a personal computer, not shown), coupled to the IP network 32 through a second CPE device 34 having the same capabilities as the CPE device 24 for converting a voice call to a VOIP call and vice versa.

An IP call gateway 36 links the IP network 32 to the PSTN 30 to permit a call originating in one network to pass into the other and vice versa. To this end, the gateway 36 converts a POTS call from the PSTN 30 into a VOIP call for receipt in the IP network 32, and likewise converts a VOIP call from the IP network into a POTS call for receipt in the PSTN network. In this way, the called party 16, which enjoys a link through the PSTN 30 to the gateway 36, can receive a POTS call that originated as a VOIP call launched from the one of the parties 12 and 18.

In accordance with the invention, a call from a calling party (i.e., calling party 12) is routed to one or more called parties (e.g., called parties 14, 16, and 18) in accordance with a network preference of the calling party, while taking into account the network capability of the called party. To accomplish such routing, the network 10 includes a database 40 that contains a record for each called party indexed by the called party's telephone number (or numbers). Each record specifies the network capability of the associated called party, i.e., the ability of that party to receive calls over a particular network. Thus, upon receipt of the called party's number, the database 40 will return that called party's network capability. For example, the record for the called party 14 specifies that this party only has the capability to receive POTS calls via the PSTN 30 and thus, upon receiving the telephone number of the called party 14, the database will return such information. By contrast, the record in the database 40 for the called party 16 specifies this party has the ability to receive POTS directly from the PSTN and also has the ability to receive calls via the gateway 36. The database record for the called party 18 specifies that this party is IP-enabled, and can receive IP calls directly from the IP network 32 and also can receive calls via the gateway 36, as well as the ability to receive calls that are redirected back to CPE 24 for completion via LEC baseband access network 26 and PSTN 30.

If desired, the network capability information in each record for a given called party may include cost information for the routing of a call on each network on which the called party can receive a call. For example, the called party 16 can receive calls both through the PSTN 30 and through gateway 36 from the IP network. Associated with routing a call over each network is a transport cost. In determining the network capability of a called party having access through two or more networks, the CPE device 24 receiving the response from the database 40 to the original query may compare the prices and choose to route the call on over the least cost network. For example, since the called party 16 may receive a call over both the PSTN 30 and over the IP network 32 via the gateway 32, the CPE device 24 could choose to route a call to that called party over the lower cost route.

Updates to the records in the database 40 occur in response to changes in the network capability of the called parties. For example, once the called party 18 becomes available to receive VOIP calls, that status information passes to the database 40 for updating of the record associated with the called party 18. Thus, the called party may effectuate an update of the database 40. Similarly, changes in network capability and other factors such as network cost for each called party also pass to the database 40 for updating of the corresponding called party records. Thus, the provider of network service may also update the database.

Figure 2:
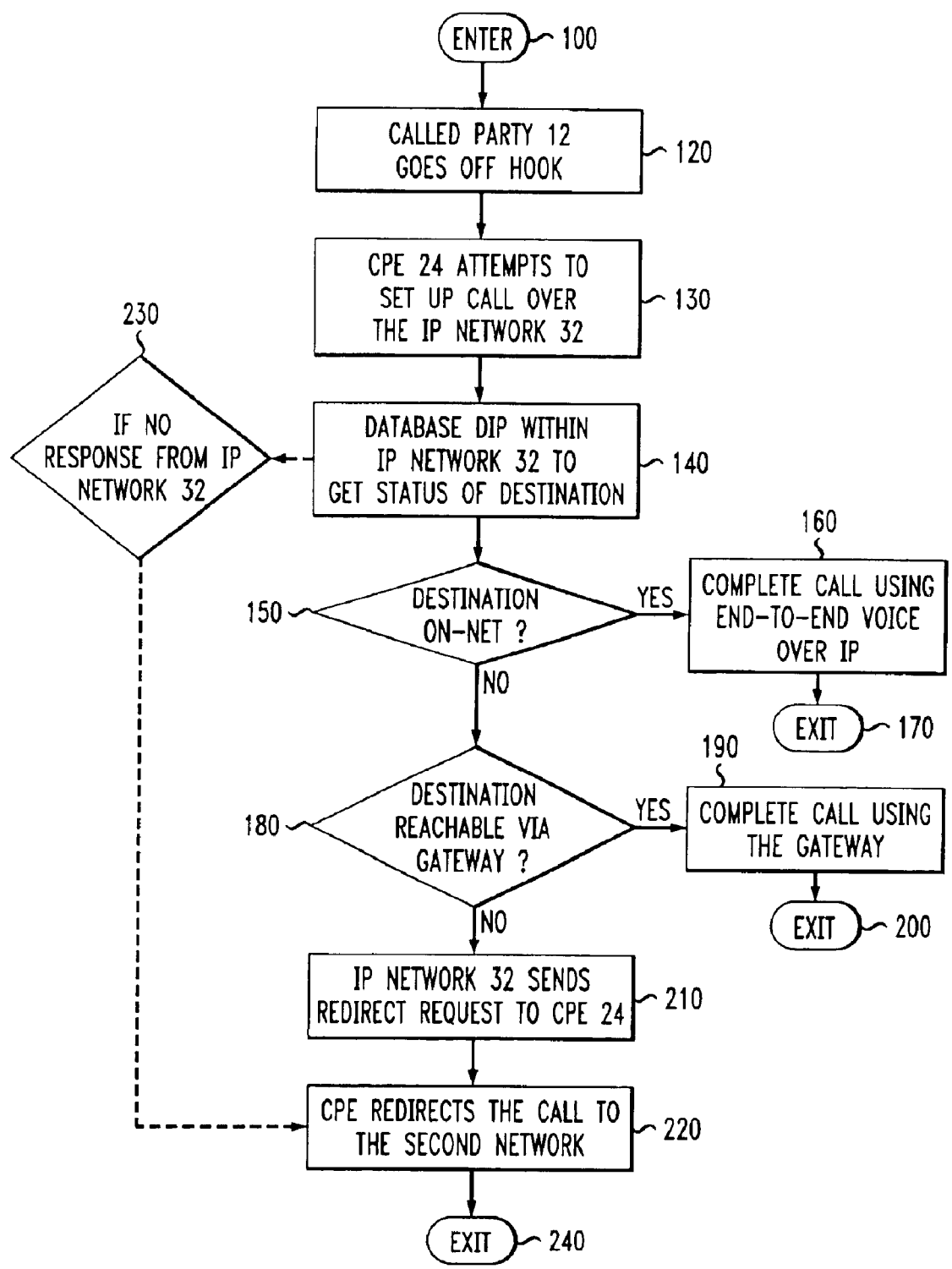
FIG. 2 illustrates in flow chart form the steps by which a call is routed through the network of FIG. 1.

FIG. 2 depicts the steps executed by the network 10 to route a call originated by the calling party 12 to one of the called parties 14, 16, and 18 in accordance with the network preference of the calling party while taking into account the capability of the called party. The process commences at the entry step (step 100), whereupon the network 10 then waits for the calling party 12 to go off hook (step 120). Once the calling party 12 goes off hook the CPE 24 initially tries to set-up a call to the called party over a network preferred by the calling party, say the IP network 32 (step 130).

As discussed previously, not every called party has the capability to receive a VOIP call launched on the IP network 32. Therefore, following step 130, the CPE device 24 of FIG. 1 launches a query to the database 40 to get the status of the call destination (step 140). In other words, the CPE device 24 of FIG. 1 queries the database 40 to access the record of the called party in accordance with that party's telephone number to ascertain the status (network capability) of the called party. Having accessed the called party's record, a check is made whether the called party is IP-enabled, (i.e., whether the called party is a destination reachable through the IP network 32 of FIG. 1) (step 150). If the called party is indeed IP-enabled, and thus reachable through the IP network 32 of FIG. 1, the call will complete over the IP network (step 160), provided no other rationale, such as cost, exists for not completing the call. Thereafter, the CPE device exits the process (step 170).

If the called party is not a destination on the IP network 32, then a determination is made during step 180 whether the called party is reachable through the gateway 36. For example, when the calling party 12 seeks to reach the called party 16, the database query made during step 140 will reveal that the called party 16 is not a destination on the IP network 32, but is nonetheless reachable through the gateway 36. Following step 180, for a called party (e.g., called party 16) reachable through the gateway 36, the CPE device 24 of FIG. 1 effects routing of the call through the gateway (step 190) and thereafter, CPE device 24 exits the process.

If the called party is not a destination on the IP network 32, and is not reachable through the gateway 36 of FIG. 1, then the IP network 32 of FIG. 1 sends a redirect request back to the CPE device 24 of FIG. 1 during step 210 of FIG. 2. whereupon the CPE device 24 redirects the call into an alternate (second) network, such as the PSTN network 30 (step 220). The CPE device 24 will also re-direct the call to the second (alternate) network following step 230 during which a check is made whether any response has been received from the IP network 32 upon querying the database 40 of FIG. 1 during step 140 of FIG. 2. Following redirection of the call to the second network, the CPE device 24 exits the process (step 24).

The foregoing describes a technique for routing a call to a called party in accordance with a network preference of the calling party while taking into account the network capability of the called party.

The above-described embodiments merely illustrate the principles of the invention. Those skilled in the art may make various modifications and changes that will embody the principles of the invention and fall within the spirit and scope thereof.

What is claimed is:

1. A method for routing a call from a calling a party to a called party in accordance with a network preference of the calling party while accounting for a network capability of the called party, comprising the steps of:

receiving in a first network preferred by the calling party a call attempt to reach the called party;

querying a database, containing records of called parties, each specifying a network capability of corresponding called party, to ascertain whether said called party has the capability of receiving the call through the preferred network, and if so;

routing the call over the preferred network, otherwise;

ascertaining whether a gateway exists between the preferred network and an alternate network over which the called party has the capability of receiving the call, and if so, routing the call through the gateway, otherwise;

sending a redirect message to the calling party to redirect the call entirely over the alternate network;

wherein the call is routed entirely over the alternate network if no response is received from the database within a prescribed interval.

2. The method according to claim 1 wherein the database is queried by receiving a telephone number associated with said called party.

3. The method according to claim 2 wherein said database is updated by a provider of telecommunications service.

4. The method according to claim 2 wherein said database is updated by the called party.

5. The method according to claim 2 wherein said database is updated by the called party CPE device.

6. The method according to claim 1 wherein the querying step includes the step of ascertaining whether the called party has the capability of receiving calls through both the preferred and alternate networks, and if so, then routing the call over the network having the least cost.

7. The method according to claim 1 wherein said preferred network is determined by using least cost routing criteria of the preferred and alternate networks.

8. A method for routing a call from a calling party to a called party over an IP network preferred by the calling party while accounting for a network capability of the called party, comprising the steps of:

receiving in the IP network a call attempt to reach the called party;

querying through the IP network a database, containing records of called parties, each specifying a network capability of corresponding called party, to ascertain whether said called party has the capability of receiving the call through the IP network, and if so:

routing the call over the IP network, otherwise;

ascertaining whether a gateway exists between the IP network and an alternate network over which the called party has the capability of receiving the call, and if so, routing the call through the gateway, otherwise;

sending a redirect message to the calling party to redirect the call entirely over the alternate network;

wherein the call is routed entirely over the PSTN if no response is received from the database within a prescribed interval.

9. The method according to claim 8 wherein the database is queried by receiving a telephone number associated with said called party.

10. The method according to claim 8 wherein said database is updated by a provider of telecommunications service.

11. The method according to claim 8 wherein said database is updated by the called party.

12. The method according to claim 8 wherein said database is updated by the called party CPE device.

13. The method according to claim 8 wherein the querying step includes the step of ascertaining whether the called party has the capability of receiving calls through both the IP network and the PSTN, and if so, then routing the call over the network having the least cost.

14. The method according to claim 8 wherein said preferred network is determined by using least cost routing criteria of the preferred and alternate networks.

15. A method for routing a call from a calling party to a called party in accordance with a least cost network preference of the calling party while accounting for a network capability of the called party, comprising the steps of:

receiving from the calling party in an originating network a call attempt to reach the called party;

querying a database, containing records of called parties, each record specifying a network capability of a corresponding called party, including cost information for routing a call on each network on which the called party can receive a call, to ascertain whether said called party has the capability of receiving the call through two or more networks, and if so;

routing the call over at least a portion of the network having a least cost, otherwise;

routing the call over at least a portion of an alternate network on which the called party can receive the call;

wherein the call is routed entirely over the alternate network if no response is received from the database within a prescribed interval.

16. The method according to claim 15 wherein the call to the called party is routed over the originating network to the least cost network when a gateway exists between the originating and least cost networks.

17. The method according to claim 15 wherein the call is routed entirely over the least cost network when no gateway exists between the originating and least cost networks.

18. The method according to claim 15 wherein the database is queried by receiving a telephone number associated with said called party.

19. The method according to claim 18 wherein said database is updated by a provider of telecommunications service.

20. The method according to claim 18 wherein said database is updated by the called party.

21. The method according to claim 18 wherein said database is updated by the called party CPE device.

22. The method according to claim 15 wherein the step of routing the call over at least a portion of an alternate network on which the called party can receive the call further comprises:

ascertaining whether a gateway exists between the originating network and the alternate network, and if so, routing the call through the gateway, otherwise;

sending a redirect message to the calling party to redirect the call entirely over the alternate network.

* * * * *